July 28, 1942.  H. NUTT  2,291,405
FRICTION CLUTCH
Filed July 26, 1939  2 Sheets-Sheet 1
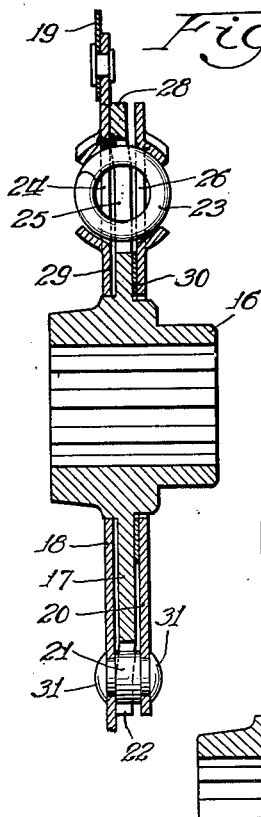
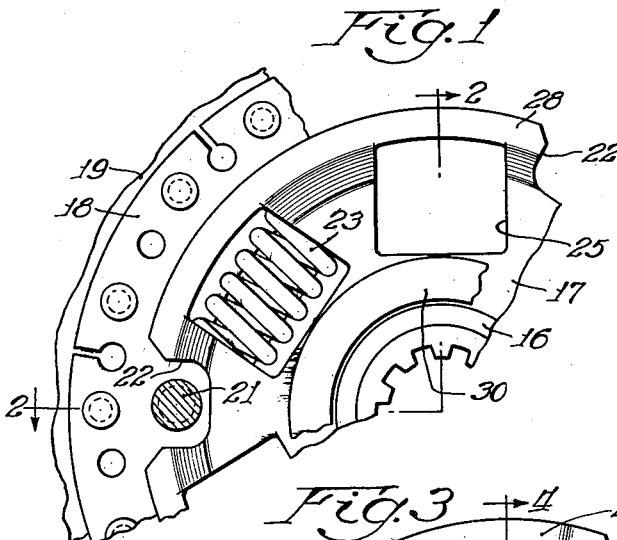
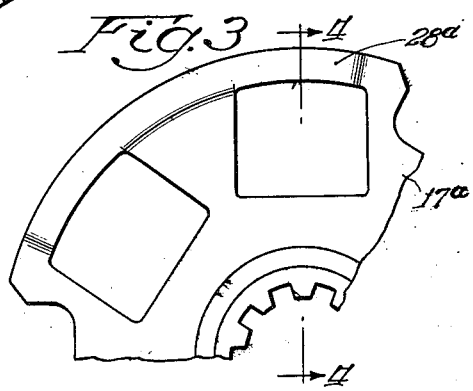
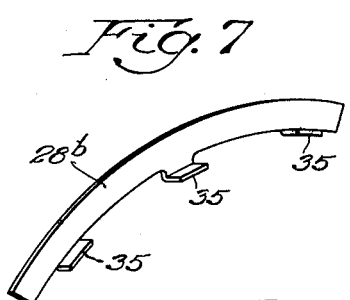
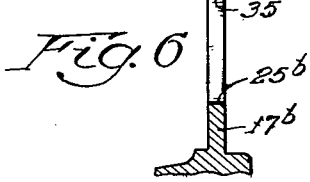
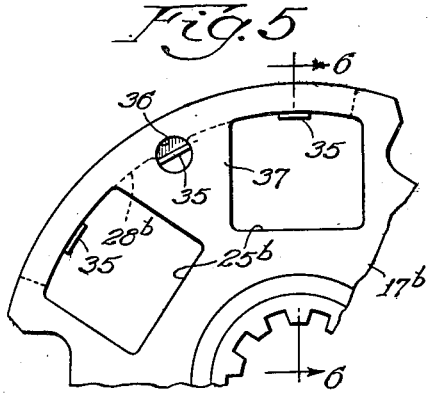
Inventor:
Harold Nutt
By: Edward C. Gritzbaugh
Atty.

July 28, 1942.   H. NUTT   2,291,405
FRICTION CLUTCH
Filed July 26, 1939   2 Sheets-Sheet 2
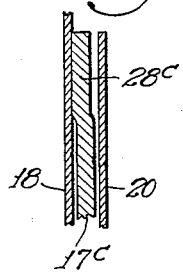
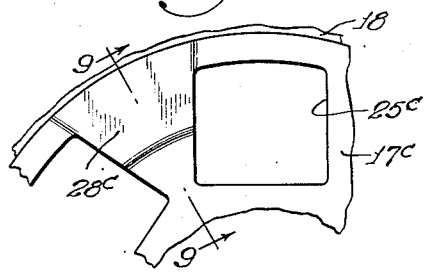
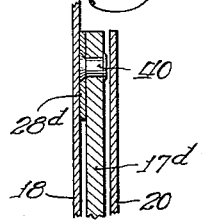
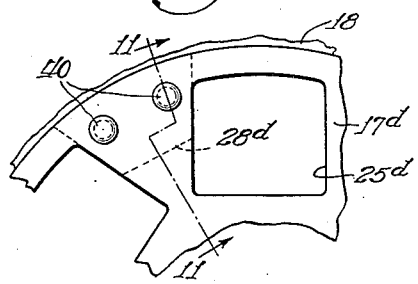
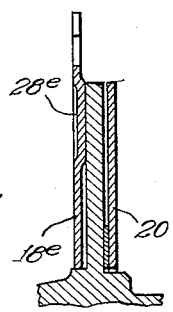
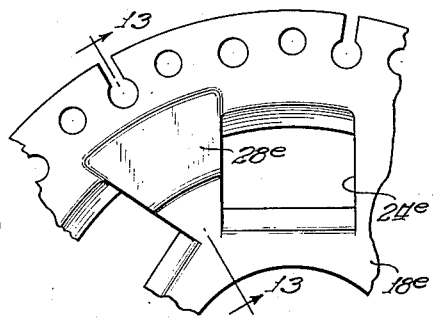
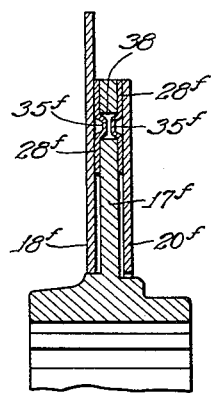
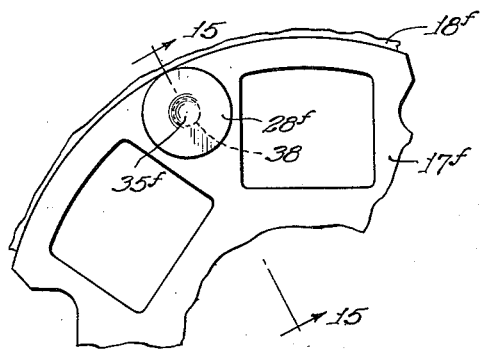
Inventor:
Harold Nutt
By: Edward C. Gritzbaugh
Atty.

Patented July 28, 1942

2,291,405

UNITED STATES PATENT OFFICE

2,291,405

FRICTION CLUTCH

Harold Nutt, Chicago, Ill., assignor to Borg-Warner Corporation, Chicago, Ill., a corporation of Illinois Application July 26, 1939, Serial No. 286,523

6 Claims. (Cl. 192—68)

This invention relates to friction clutches of the type used in automotive vehicles, and particularly to the driven plate of such a clutch. The general object of the invention is to provide, in such a driven plate, a torsional vibration dampening mechanism of the general type utilizing a combination of yielding cushioning means and braking means for checking relative oscillation between the hub and the facing supporting disc, wherein there is provided an improved arrangement of braking means, adapted to give a much higher braking efficiency than has been possible in prior constructions.

To this end, the invention contemplates an arrangement including means for effecting braking coaction between the hub flange and the facing mounting disc or the retainer plate which is associated therewith, the areas of braking engagement being confined to the peripheral region of the hub flange so as to obtain maximum leverage.

Another object of the invention, in one of its aspects, is to provide an arrangement of this kind wherein the peripheral braking area is added to the conventional braking area at the hub, one of the areas being disposed between the hub flange and the facing mounting disc and the other being disposed between the hub flange and the retainer plate, and the remaining areas of the three members being spaced apart axially and biased toward each other under constant tension such as to maintain the friction surfaces in engagement under pressure over extended periods of wear.

Other objects, the advantages and uses of the invention will become more apparent after reading the following specification and claims, and after consideration of the drawings forming a part of the specification, wherein:

Figure 1 is a fragmentary elevation of the hub of a clutch embodying the invention;

Figure 2 is an axial sectional view of a portion of the hub assembly of a clutch embodying the invention, taken as indicated by the line 2—2 of Figure 1;

Figure 3 is a fragmentary elevation of the hub portion of a clutch embodying a modified form of the invention;

Figure 4 is an axial sectional view of the same taken as indicated by the line 4—4 of Figure 3;

Figure 5 is a fragmentary elevation of the hub portion of a clutch embodying another modification of the invention;

Figure 6 is an axial sectional view of the same taken as indicated by the line 6—6 of Figure 5;

Figure 7 is a perspective view of the friction shoe of Figure 5;

Figure 8 is a fragmentary elevation of the hub region of a clutch embodying another form of the invention;

Figure 9 is an axial sectional view thereof taken as indicated by the line 9—9 of Figure 8;

Figure 10 is a fragmentary elevation of the hub portion of a clutch embodying another modification of the invention;

Figure 11 is an axial sectional view thereof taken as indicated by the line 11—11 of Figure 10;

Figure 12 is a fragmentary elevation of the hub portion of a clutch embodying another modification of the invention;

Figure 13 is an axial sectional view of the same taken as indicated by the line 13—13 of Figure 12;

Figure 14 is a fragmentary elevation of the hub portion of a clutch embodying another modification of the invention; and Figure 15 is an axial sectional view of the same taken as indicated by the line 15—15 of Figure 14.

As an illustration of one form in which the invention may be embodied, I have shown, in Figures 1 and 2, portions of a clutch driven plate embodying a hub 16 having a radially extending flange 17, a facing mounting disc 18 centrally apertured to receive the hub and associated with one side of the flange 17, facing mounting cushions 19 serving to connect the facing (not shown) to the disc 18, and a retainer plate 20, in the form of an annular ring receiving the hub 16 at its center, and associated with the other side of the flange 17.

The retainer plate 20 and mounting disc 18 are secured together by means of shouldered stop pins 21 which extend through notches 22 in the periphery of the hub flange 17, the notches 22 being of sufficient circumferential dimension to allow the requisite oscillation between the hub flange 17 and the disc 18 and retainer plate 20 before a positive drive is established between the stop pin 21 and the edges of the notches.

The torsional vibration dampening mechanism includes the conventional cushioning elements in the form of coil springs 23 seated in windows 24, 25 and 26 in the mounting disc 18, the hub flange 17 and the retainer plate 20 respectively. The ends of the springs 23 engage the ends of the windows 24, 25 and 26 so that in order for the flange 17 to oscillate relative to the mounting disc 18 and retainer plate 20, the springs must be compressed.

The cushioning action of the springs 23 is controlled by the braking mechanism which will now be described, in such a manner that any oscillation which might tend to follow an initial compression of the springs 23 under a sudden torque load change, is quickly damped out, and the resistance offered by the cushioning means, is augmented.

The present invention does not purport to be the first to combine the resilient action of cushioning means such as springs, with the dampening action of braking means in forming a torsional vibration dampener of a friction clutch driven plate. However, in the post, the braking means has been restricted to the use of friction rings disposed between the hub flange and the embracing disc members, immediately adjacent the hub. Such braking means is effective to a limited extent. The present invention proposes to greatly increase the effectiveness of the braking means.

Accordingly, the present invention provides in the form of the invention shown in Figures 1 and 2, an arrangement including means, such as the laterally offset shoe portions 28 of the flange 17 providing braking engagement with adjacent surfaces of the mounting disc 18 in areas that are restricted to the peripheral regions of the flange 17, the remaining areas of the adjacent faces of the mounting disc 18 and flange 17 being spaced apart as at 29.

The space 29 insures the concentration of braking action between the members 18 and 17 at the periphery of the flange 17. The leverage obtained in these peripheral areas is at least twice that obtained at the hub, and thus the braking effect per unit of area is doubled. The disposition of the braking area at a point substantially radially outwardly of the hub makes available a greater total area of braking surface and therefore permits of a reduction in the actual braking load per unit of area of the friction contact surfaces.

An important aspect of the invention is the concentration of braking action at the periphery so as to secure maximum braking action for a given amount of axial braking pressure. This is particularly important where it is desired to avoid the expense of fine accuracy in machining of the coacting braking surfaces. By restricting the braking surfaces to the peripheral regions, the natural resiliency of the parts will assure complete braking contact over the braking area under pressure developed by the circumferentially spaced stop pins 21.

In addition to the foregoing, the invention contemplates a simple means for maintaining the shoe 28 and disc 18 permanently under pressure against each other over extended periods of wear, and therefore makes provision for taking up the wear. One method of accomplishing this is to interpose a conventional friction washer 30 between the hub flange 17 and the retainer plate 20, whereby the remaining areas of the adjacent faces of the flange 17 and retainer plates 20 will be spaced apart. This arrangement permits of the use of the conventional stop pin 21, and the riveting of the members 18 and 20 against the shoulders of the pin 21, by means of the rivet heads 31, with the space between the shoulders of the pin somewhat less than the combined thicknesses of the flange 17 and the friction washer 30 plus the amount of offset between the shoe 28 and the body of the flange 17. As a result, the peripheral region of the retainer plate 20 is biased or distorted towards the flange 17, establishing the necessary pressure between the friction surfaces provided by the washer 30 and shoe 28, and allowing the friction elements to wear down without materially diminishing that pressure. The distortion of the retainer plate 20 will function to take up the wear in both regions of braking action, and the space 29 will allow the disc 18 to approach closer to the body of the flange 17 as the shoe 28 wears down, so as to maintain the full efficiency of braking action between the peripheral region of the flange 17 and the disc 18.

The invention as shown in Figures 1 and 2 utilizes the peripheral region of the flange 17 beyond the outer extremity of the windows 25, in order to form the friction show 28. This gives a maximum of efficiency of braking action, since, whatever pressure is established by the biasing of the members 18 and 20 toward each other, is concentrated at a maximum radius from the axis of rotation. The same is true of the form of the invention shown in Figures 3 to 7 inclusive.

However, the invention is not intended to be limited to the restriction of the braking area to the peripheral region lying beyond the outer extremities of the windows. For example, the friction surface may be in the form of pads 28c, 28d, or 28e, disposed between the windows 25 and projecting into the peripheral region lying outwardly of the windows, although not completely utilizing such peripheral region.

The means for forming the peripheral braking surface may be either in the form of integral shoes formed by offsetting the peripheral extremities of the hub flange 17 in an axial direction, as at 28 in Figures 1 and 2, 28a in Figures 3 and 4, 28c in Figures 8 and 9, or 28e in Figures 12 and 13, or may be in the form of separate shoes 28b as in Figures 5, 6 and 7, shaped to fit the peripheral region of the flange 17b, which in this case is perfectly flat, or independent segments 28d as in Figures 10 and 11, or circular buttons 28f, as in Figures 14 and 15.

The separate shoes 28b may be formed of any suitable friction or bearing material such as for example, graphite bronze. The segments 28d of Figures 10 and 11 or the buttons 28f of Figures 14 and 15 may likewise be of graphite bronze. In order to secure the shoes 28b against radial displacement under the effect of centrifugal force, each shoe may be provided with a plurality of circumferentially spaced fingers 35, bent in an axial direction and adapted to engage the peripheral region of the flange 15. The two outer fingers 35 extend through the windows 25b. The central finger 35 is extended through an opening 36 in the web 37 between a pair of windows 25. The engagement of the central finger 25 in the opening 36 secures the shoe 28b against radially inward displacement. Tilting of the shoe around the axis of the opening 36 is prevented by the engagement of the outer fingers 35 in the windows 25.

In the form shown in Figures 14 and 15, the buttons 28f may be retained by teats 35f, formed in the centers of the buttons and projecting into openings 38 in the flange 17. When the parts are assembled with the mounting disc and retainer plate riveted upon the ends of the stop pins 21, the shoes 28b or 28f as the case may be, will be securely held against displacement in any direction.

In the forms shown in Figures 10 and 11, the shoes 28d are permanently attached to the flange 17 by rivets 40.

The offset friction shoes, whether formed integrally or separately, may be carried either by the flange 17, as in Figures 1 to 10, 14 and 15, or by the disc 18 or the retainer plate 20. Figures 12 and 13 illustrate an example of forming the friction shoe in the mounting disc 18.

Briefly describing each of the separate forms of the invention, Figures 1 and 2 illustrate the friction shoe 28 formed by offsetting the entire length of the peripheral portion of each segment of the flange 17, the friction surface being confined to the regions beyond the windows 25. Figures 3 and 4 show the same construction with the exception that the offset shoe portion 28a is terminated short of the ends of the segments of the flange 17a.

Figures 5, 6 and 7 likewise show a form in which the shoe 28b is confined to the peripheral region beyond the window 25b, the shoe being formed separately.

Figures 8 and 9 illustrate a form of the invention in which the shoes 28c are segmental, occupy only portions of the peripheral region of the flange 17c, and extend into the space between the windows 25c.

Figures 10 and 11 show a form in which the shoes 28d are segmental as in Figures 8 and 9, but are formed separately.

Figures 12 and 13 likewise illustrate the friction shoes 28c in the segmental form extending between the windows 24e, formed in this case in the mounting disc 18e.

Figures 14 and 15 show a form of the invention wherein the shoes 28f are in the form of circular buttons, piloted in the openings 38 by means of the teats 35f. In this form of the invention, the small diameter friction washers 30 are eliminated entirely, and in order to develop pressure against the buttons, the mounting disc 18f and retainer plate 20f may be distorted toward each other in areas circumferentially intermediate the buttons 28f.

I claim:

1. In a friction clutch, a hub having a flange, a pair of members including a facing mounting member and a retainer member embracing said flange; means providing braking coaction between said flange and one of said members in an area adjacent the periphery of the flange, means providing braking coaction between said flange and the other of said members in an area adjacent the hub, and means tying said members together under distortion such as to maintain said braking coaction under continuous pressure, there being an unobstructed space between the inner region of said one member and said flange, and an unobstructed space between the outer region of said other member and said flange, whereby to permit said inner and outer regions to be freely distorted toward the flange by said tying means and thereby improve the uniformity of contact between the coacting braking surfaces.

2. A friction clutch as defined in claim 1, wherein said first mentioned braking coaction is between the periphery of the hub flange and said mounting member and the second mentioned coaction is between said retainer member and said flange.

3. A friction clutch as defined in claim 1, wherein said first mentioned area of braking coaction is segmental in shape and wherein said members are provided with spring seating windows located between said segmental areas.

4. A friction clutch as defined in claim 1, wherein the peripheral region of the hub flange is offset axially into direct contact with said mounting member to provide said first mentioned braking coaction and including a friction ring interposed between the hub flange and said retainer member to provide said second mentioned braking coaction.

5. In a friction clutch plate assembly, means defining a hub having a radially extending flange disposed intermediate the ends thereof, a pair of generally disc-like centrally perforated members embracing said hub on opposite sides of said flange, one of said members being adapted to support a facing assembly, a first side portion of said flange being axially offset with reference to a second side portion of said flange radially spaced from said first portion and on the opposite side of said flange from said first portion, whereby said first portion of said flange engages a first one of said disc-like members frictionally while said second portion of said flange is associated frictionally with the other of said disc-like members, and means tying said disc-like members together tending to compress said flange and flatten out said offset relationship to thus maintain constant uniform frictional contact between the elements of said assembly to thus effect resistance to relative arcuate movement therebetween.

6. In a friction clutch plate assembly, means defining a splined hub having a radially outwardly extending flange disposed between the axial extremities thereof, a pair of disc-like centrally orificed members embracing said hub on opposite sides of said flange one of said disc-like members being adapted to carry a friction facing assembly extending beyond the periphery thereof, said disc-like members and said flange being formed with complementary openings therein, compression coil springs received in said openings for resiliently opposing relative arcuate movement between said elements, said arrangement being particularly characterized by said flange being formed with a radially outer portion axially offset with reference to an inner portion of said flange, the outer of said flange portions being in frictional engagement with one of said members, a friction ring interposed between the inner of said flange portions and the other of said members, and means tying said disc-like members together compressing said flange therebetween thus tending to flatten said offset portions in the direction of the same general plane under continuous pressure, to thus provide frictional resistance to the relative movement at radially spaced portions on opposite sides of said flange.

HAROLD NUTT.